United States Patent [19]
Schmidt

[11] 3,742,121
[45] June 26, 1973

[54] TAP-OFF SECTION FOR A FEEDER BUS DUCT RUN
[75] Inventor: John E. Schmidt, Oxord, Ohio
[73] Assignee: Square D Company, Park Ridge, Ill.
[22] Filed: Feb. 28, 1972
[21] Appl. No.: 229,766

[52] U.S. Cl.............. 174/72 B, 174/88 B, 339/22 B
[51] Int. Cl............................................ H02g 15/08
[58] Field of Search ................. 339/22 B; 174/72 B, 174/71 B, 88 B, 99 B, 68 B, 70 B, 16 B

[56] References Cited
UNITED STATES PATENTS
3,339,009  8/1967  Davis et al. .................. 174/72 B
3,376,377  4/1968  Fehr, Jr........................ 174/72 B
3,459,872  8/1969  Weimer........................ 174/88 B X Primary Examiner—Darrell L. Clay
Attorney—Harold J. Rathbun and Paul J. Rose

[57] ABSTRACT

The flat bus bars of the tap-off section are outwardly offset in their central portions from their closely spaced relationship in the adjoining portions. Connectors having relatively wide rectangular contact plate portions are electrically connected respectively to the central portions of the bus bars in a single-bolt type joint. Each connector has a relatively narrow off-center connecting strap portion, the free end portion of which extends perpendicularly to the contact plate portion. The lengths of the perpendicularly extending free end portions of the connecting strap portions vary according to the distances of the contact plate portions from a side of the tap-off section. In a four-pole tap-off section, two connecting strap portions are disposed at the top of the tap-off section and spaced from each other longitudinally of the tap-off section, and two connecting strap portions are disposed at the bottom of the tap-off section and spaced from each other longitudinally of the tap-off section. In a double run of parallel connected feeder bus duct sections, each connector of a tap-off section is electrically connected to a pair of corresponding bus bars connected respectively in the two runs.

10 Claims, 6 Drawing Figures

PATENTED JUN 26 1973 3,742,121

TAP-OFF SECTION FOR A FEEDER BUS DUCT RUN

This invention relates to a tap-off section for a run of feeder bus duct such as disclosed in U.S. Pat. No. 3,187,086, issued June 1, 1965.

In prior tap-off sections, connections to bus bars were made by welding connecting straps to the edges of the bus bars. The operation was tedious, results were not always consistent, and excess welding metal at the joints had to be ground off in order to closely space the bus bars.

In accordance with this invention, the closely spaced bus bars of a tap-off section are outwardly offset in their central portions to provide room for insulators and for connectors having relatively wide rectangular contact plate portions electrically connected respectively to the central portions of the bus bars in a single-bolt type joint. Each connector has a relatively narrow off-center connecting strap portion, the free end portion of which extends perpendicularly to the contact plate portion.

An object of the invention is to provide an improved tap-off section for a feeder bus duct run.

Another object is to provide a tap-off section having closely spaced bus bars outwardly offset in their central portions and having connectors with relatively wide rectangular contact plate portions electrically connected respectively to the central portions of the bus bars and with relatively narrow off-center connecting strap portions, the free end portions of which extend perpendicularly to the contact plate portions.

Other objects will appear when the following description is considered along with the accompanying drawings in which.

Figure 1:
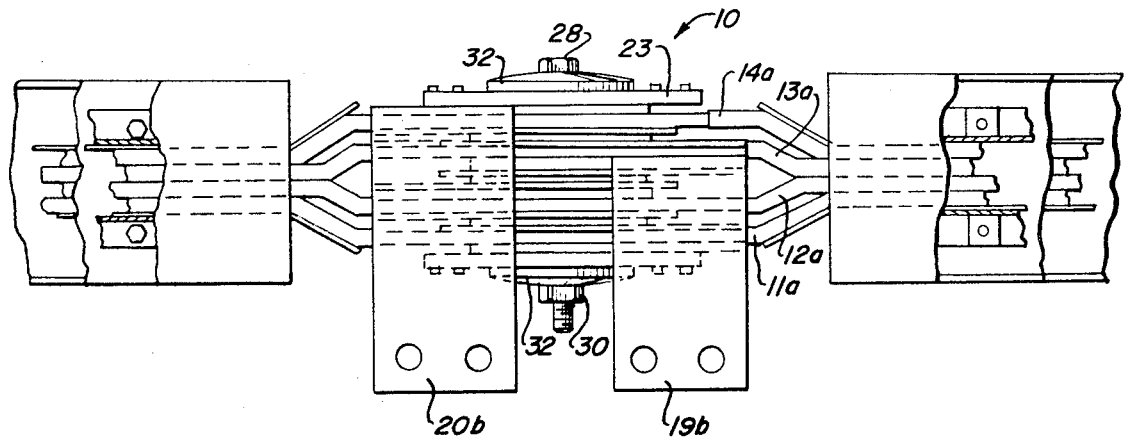
FIG. 1 is a fragmentary top view of a tap-off section constructed in accordance with the invention.

With reference to the drawings, a central portion of a tap-off section 10 constructed in accordance with the invention is shown. In this embodiment, the tap-off section 10 is a four-pole double section including an upper portion 10a and a lower portion 10b each having four generally flat bus bars (bus bars 11a, 12a, 13a, and 14a in the upper portion 10a and bus bars 11b, 12b, 13b, and 14b in the lower portion 10b) and each having opposite end portions respectively constructed with respect to housing, bus bars, and insulators substantially as shown in the four-pole feeder bus duct section of FIGS. 10 and 11 of the above-mentioned Pat. No. 3,187,086, for connection to upper and lower portions of a double run of feeder bus duct.

As shown in FIG. 1, the bus bars 11a, 12a, 13a, and 14a of the upper portion 10a are outwardly offset in their central portions from their closely spaced relationship in the adjoining portions on each side of their central portions. The bus bars 11b, 12b, 13b, and 14b of the lower portion 10b are correspondingly outwardly offset in their central portions.

Figure 3:
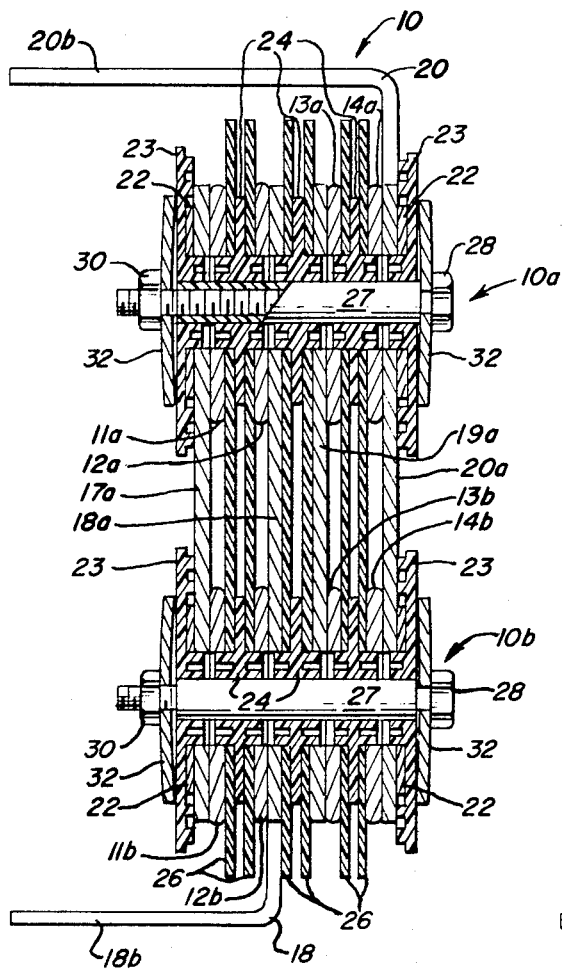
FIG. 3 is an enlarged sectional view taken along the line 3—3 of FIG. 2.
Figure 4:
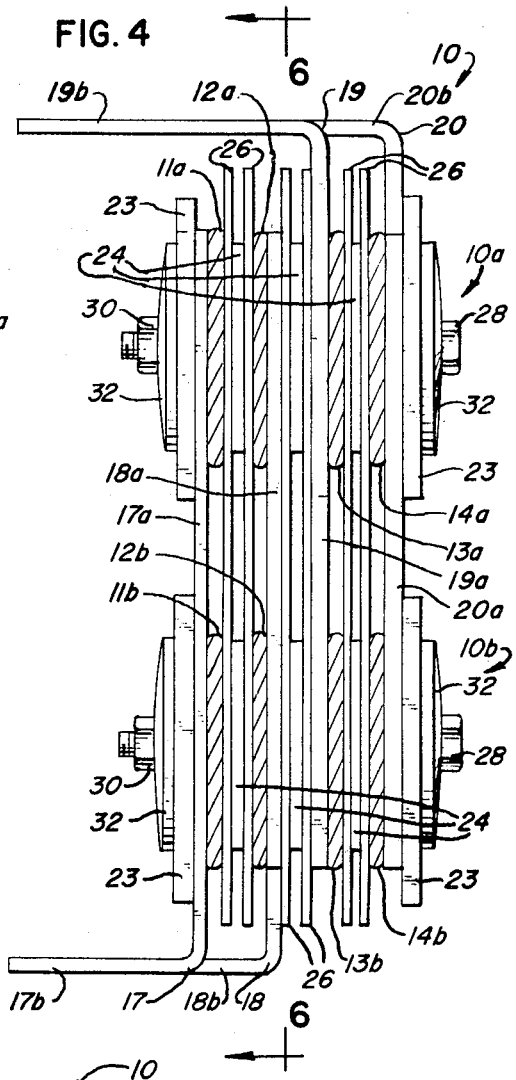
FIG. 4 is an enlarged sectional view taken along the line 4—4 of FIG. 2.
Figure 5:
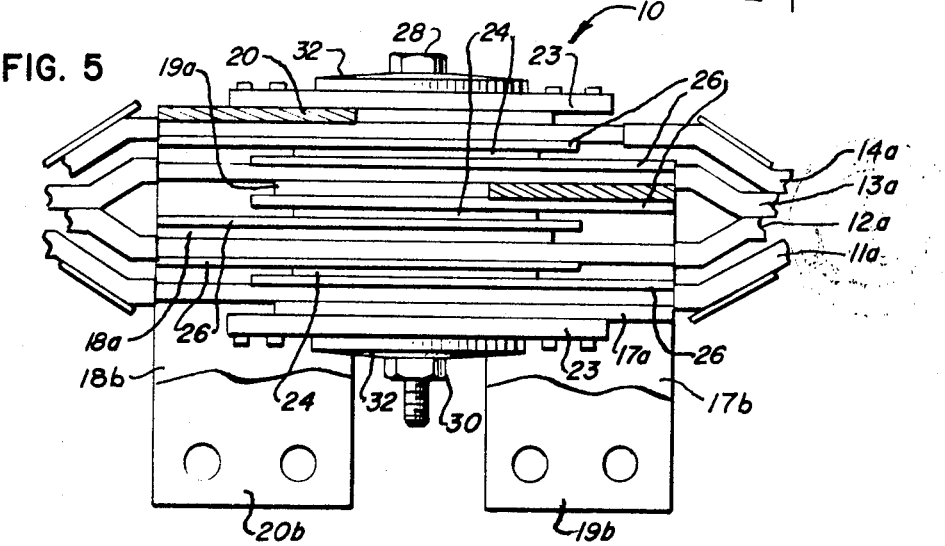
FIG. 5 is an enlarged view of a central part of FIG. 1, with portions broken away.
Figure 6:
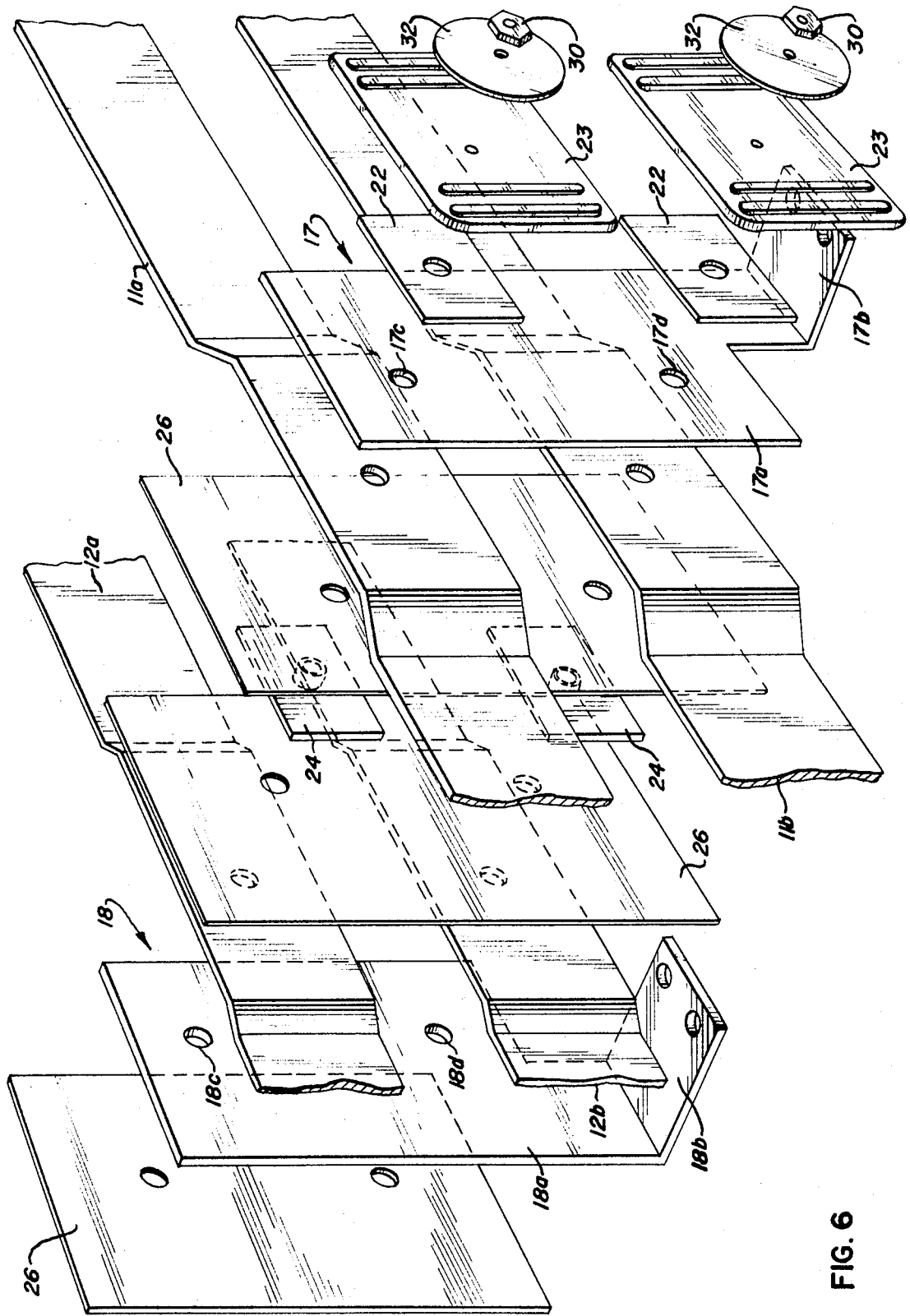
FIG. 6 is a fragmentary exploded perspective view of various parts of the tap-off section of FIGS. 1 and 2, the parts being those located on the left side of the line 6—6 of FIG. 4.

As best shown in FIGS. 3, 4, and 5, four connectors 17, 18, 19, and 20 have relatively wide rectangular contact plate portions 17a, 18a, 19a, and 20a electrically connected respectively to the pairs of bus bars 11a and 11b, 12a and 12b, 13a and 13b, and 14a and 14b. The connectors 17 and 18 are best shown in FIG. 6. The connectors have relatively narrow off-center connecting strap portions 17b, 18b, 19b, and 20b, respectively, the free end portions of which extend all in the same direction perpendicularly to their respective contact plate portions 17a, 18b, 19a, and 20a. The lengths of the perpendicularly extending free end portions of the connecting strap portions 17a, 18b, 19b, and 20b vary according to the distances of the respective contact plate portions from the side of the tap-off section 10 toward which the connecting strap portions extend. Thus, the lengths of the perpendicularly extending free end portions of the connecting strap portions 18b, 19b, and 20b are greater than the length of the perpendicularly extending free end portion of the connecting strap portion 17b by the distances from the contact plate portion 17a respectively to the contact plate portions 18a, 19a, and 20a.

Figure 2:
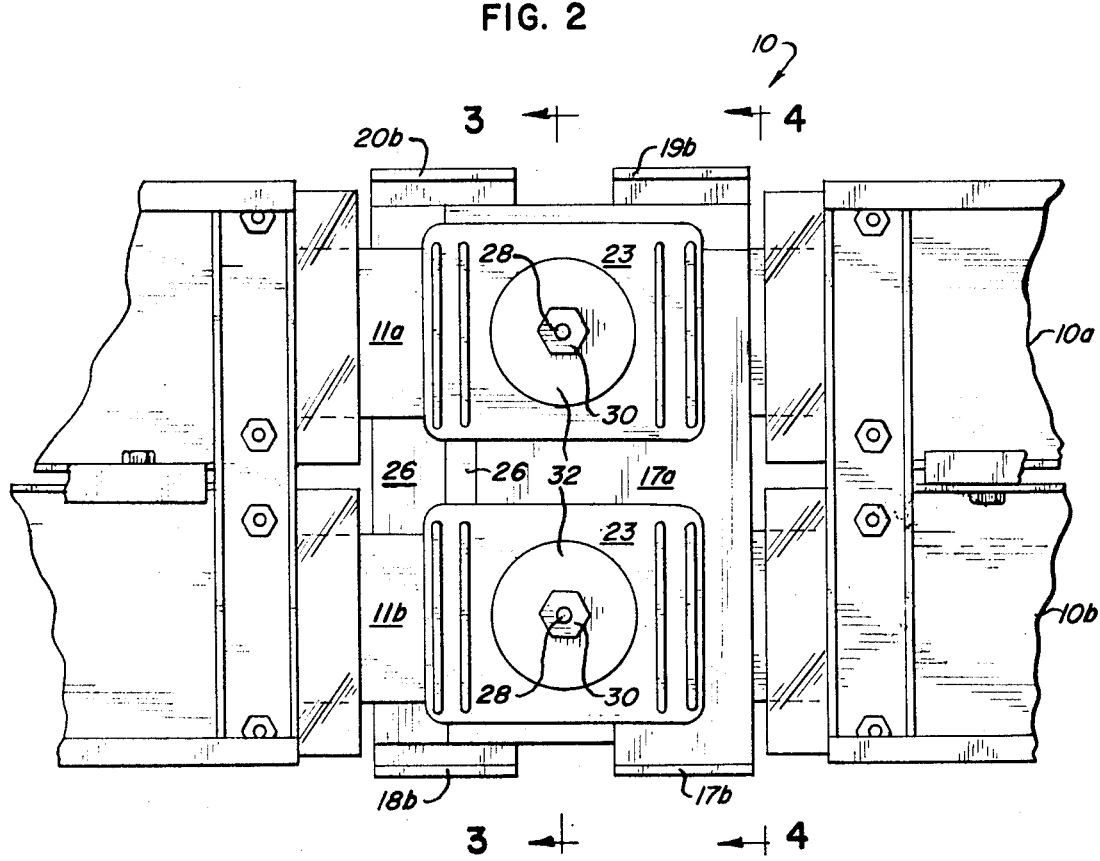
FIG. 2 is a fragmentary front view of the tap-off section of FIG. 1.

As best shown in FIG. 2, the connecting strap portions 17b and 18b are disposed adjacent the bottom of the tap-off section 10 and spaced from each other longitudinally of the tap-off section, the strap portion 17b being disposed adjacent the right-hand edge of the contact plate portion 17a as viewed in FIG. 2 and the strap portion 18b being disposed adjacent the left-hand edge of the contact plate portion 18a. The connecting strap portions 19b and 20b are disposed adjacent the top of the tap-off section 10 and spaced from each other longitudinally of the tap-off section, the strap portion 19b being disposed adjacent the right-hand edge of the contact plate portion 19a as viewed in FIG. 2 and the strap portion 20b being disposed adjacent the left-hand edge of the contact plate portion 20a, it being understood that while the contact plate portions 19a and 20a are not visible in FIG. 2, they are directly behind the contact plate portions 17a and 18a, respectively.

As shown, the contact plate portion 17a engages the outer sides of the bus bars 11a and 11b, and the contact plate portion 20a engages the outer sides of the bus bars 14a and 14b. Further, the contact plate portion 18a engages the inner sides of the bus bars 12a and 12b, and the contact plate portion 19a engages the inner sides of the bus bars 13a and 13b. The relative positions of the contact plate portions and their respective bus bars can be reversed in any one, any two, any three, or all four sets of a contact plate portion and its two respective bus bars, without departing from the scope of the invention.

Four flat generally rectangular metal spacers 22 and four generally flat rectangular insulation members 23 each having a pair of concentric annular ribs on its inner side are provided, one spacer 22 and one insulation member 23 being disposed on the outer side of each of the contact plate portions 17a and 20a in each of the upper and lower portions 10a and 10b. Six generally flat rectangular insulation members 24 each having a pair of concentric annular ribs on each of its opposite sides are also provided, one being disposed between the bus bars 11a and 12a, one between the bus bars 11b and 12b, one between the bus bars 13a and 14a, one between the bus bars 13b and 14b, and two between the contact plate portions 18a and 19a in the upper and lower portions 10a and 10b, respectively. Six flat rectangular sheet insulation members 26 extending through the upper and lower portions 10a and 10b are also provided, each pair of upper and lower insulation members 24 having a pair of the sheet insulation members 26 disposed respectively on opposite sides thereof.

In each of the upper and lower portions 10a and 10b, each of the insulation members 23 and 24 is centrally apertured to receive an insulating sleeve 27 through which a bolt 28 extends into threaded engagement with a nut 30. Each bolt 28 carries a pair of spring washers 32 disposed respectively on the outer sides of the two respective insulation members 23.

Each of the spacers 22 is centrally apertured to receive the concentric annular rib portion of the respective insulation member 23 and each of the contact plate portions 17a and 20a is provided with two suitable apertures in which the concentric annular rib portions of the two respective insulation members 23 are respectively received. Further, each of the bus bars is suitably apertured to receive a concentric annular rib portion of one of the insulation members 24, and each of the sheet insulation members 26 and each of the contact plate portions 18a and 19a is suitably apertured to receive concentric annular rib portions of an upper one and a lower one of the insulation members 24.

The apertures in the contact plate portions 17a and 18a are identified in FIG. 6 as apertures 17c and 17d in the contact plate portion 17a and apertures 18c and 18d in the contact plate portion 18a. Because the connecting strap portions 17b and 18b are substantially one-half as wide as their respective contact plate portions 17a and 18a, the apertures 17c and 17d are located off-center to the left and the apertures 18c and 18d are located off-center to the right in order to space the connecting strap portions 17b and 18b apart longitudinally of the tap-off section 10. The sheet insulation members 26 are staggered longitudinally of the tap-off section 10 by similar off-center location of the apertures therein.

Various modifications may be made in the structure shown and described without departing from the spirit and scope of the invention. The construction and arrangement is equally applicable to a tap-off section for a single run or a triple run of bus duct by decreasing or increasing the height of the contact plate portions 17a, 18a, 19a, and 20a and the sheet insulation members 26. Further, by elimination of one of the bus bars, its connector, and appropriate insulation members, a three-pole tap-off section is readily attainable.

I claim:

1. For use in a run of feeder bus duct, a tap-off section comprising a plurality of elongated generally flat bus bars flatwise aligned and spaced apart from each other by distances less than the thickness of one of the bus bars, central portions of the bus bars being outwardly offset to space the central portions apart from each other by distances greater than the thickness of one of the bus bars, and a plurality of connectors, each connector having a relatively wide contact plate portion electrically connected to the central portion of a respective one of the bus bars by engagement with a flat side thereof and having a relatively narrow off-center connecting strap portion the free end portion of which extends perpendicularly to the contact plate portion, the perpendicularly extending free end portions of the connecting strap portions of all of the connectors extending in the same direction from the contact plate portions, the perpendicularly extending free end portions of the connecting strap portions of two of the connectors being disposed oppositely from each other adjacent opposite edges of the bus bars, and the perpendicularly extending free end portion of the connecting strap portion of a third of the connectors being spaced longitudinally of the bus bars from, and disposed adjacent the same edges of the bus bars as, that of one of the other two connectors.

2. A tap-off section as claimed in claim 1 wherein the lengths of the perpendicularly extending free end portions of the connecting strap portions vary in accordance with the distances between the contact plate portions.

3. A tap-off section as claimed in claim 1 wherein each of the bus bars and each of the contact plate portions is provided with a hole, and including a bolt extending through the holes and a nut cooperable with the bolt to establish contact pressure between each contact plate portion and its respective bus bar, the hole in each contact plate portion being off-center therein in the longitudinal direction of the bus bars, and the hole in the contact plate portion of the third connector being offset in an opposite direction from the direction of offset of the holes in the contact plate portions of the other two connectors.

4. A tap-off section as claimed in claim 1 including a second plurality of the bus bars each spaced from and aligned edgewise with a corresponding bus bar of the first-mentioned plurality, and wherein the contact plate portion of each of the connectors engages a flat side of the central portion of each of two bus bars, one of each plurality.

5. A tap-off section as claimed in claim 4 wherein each of the bus bars of each plurality is provided with a hole and each of the contact plate portions is provided with a pair of holes, and including a pair of bolts, one bolt extending through the holes in the bus bars of the first-mentioned plurality and through one of the holes in each of the contact plate portions and the other bolt extending through the holes in the bus bars of the second plurality and through the other of the holes in each of the contact plate portions, and a pair of nuts cooperable respectively with the bolts to establish contact pressure between the contact plate portions and their respective pairs of bus bars, the holes in each contact plate portion being off-center therein in the longitudinal direction of the bus bars, and the holes in the contact plate portion of the third connector being offset in an opposite direction from the direction of offset of the holes in the contact plate portions of the other two connectors.

6. A tap-off section as claimed in claim 1 wherein there are four bus bars and four connectors, the perpendicularly extending free end portion of the connecting strap portion of a fourth of the connectors being disposed opposite that of the third in spaced relationship longitudinally of the bus bars to that of the other of the two connectors.

7. A tap-off section as claimed in claim 6 wherein the lengths of the perpendicularly extending free end portions of the connecting strap portions vary in accordance with the distances between the contact plate portions.

8. A tap-off section as claimed in claim 6 wherein each of the bus bars and each of the contact plate portions is provided with a hole, and including a bolt extending through the holes and a nut cooperable with the bolt to establish contact pressure between each contact plate portion and its respective bus bar, the hole in each contact plate portion being off-center therein in the longitudinal direction of the bus bars, and the holes in the contact plate portions of the third and fourth connectors being offset in an opposite direction from the direction of offset of the holes in the contact plate portions of the other two connectors.

9. A tap-off section as claimed in claim 6 including a second plurality of the bus bars each spaced from and aligned edgewise with a corresponding bus bar of the first-mentioned plurality, and wherein the contact plate portion of each of the connectors engages a flat side of the central portion of each of two bus bars, one of each plurality.

10. A tap-off section as claimed in claim 9 wherein each of the bus bars of each pluality is provided with a hole and each of the contact plate portions is provided with a pair of holes, and including a pair of bolts, one bolt extending through the holes in the bus bars of the first-mentioned plurality and through one of the holes in each of the contact plate portions and the other bolt extending through the holes in the bus bars of the second plurality and through the other of the holes in each of the contact plate portions, and a pair of nuts cooperable respectively with the bolts to establish contact pressure between the contact plate portions and their respective pairs of bus bars, the holes in each contact plate portion being off-center therein in the longitudinal direction of the bus bars, and the holes in the contact plate portions of the third and fourth connectors being offset in an opposite direction from the direction of offset of the holes in the contact plate portions of the other two connectors.

* * * * *